United States Patent [19]

Morawski

[11] 4,208,061
[45] Jun. 17, 1980

[54] CHUCK WITH RETRACTABLE STOP

[76] Inventor: London T. Morawski, 15850 Common Rd., Roseville, Mich. 48066

[21] Appl. No.: 965,289

[22] Filed: Dec. 1, 1978

[51] Int. Cl.² ............................................. B23B 31/40
[52] U.S. Cl. ................................... 279/2 R; 242/72.1; 269/48.1; 279/1 C
[58] Field of Search .................... 279/1 S, 2 R, 2 A, 4; 269/48.1; 82/44; 242/72.1

[56] References Cited

U.S. PATENT DOCUMENTS 2,829,897  4/1958  Parker et al. .......................... 279/1 S

*Primary Examiner*—Z. R. Bilinsky
*Attorney, Agent, or Firm*—Barnes, Kisselle, Raisch & Choate

[57] ABSTRACT

A collet chuck having a workpiece stop engagable with an end face of a workpiece to properly locate the workpiece on the chuck. The stop is retracted after the workpiece is gripped so as to not interfere with a cutting tool for machining the end face of the workpiece engaged by the stop.

13 Claims, 3 Drawing Figures

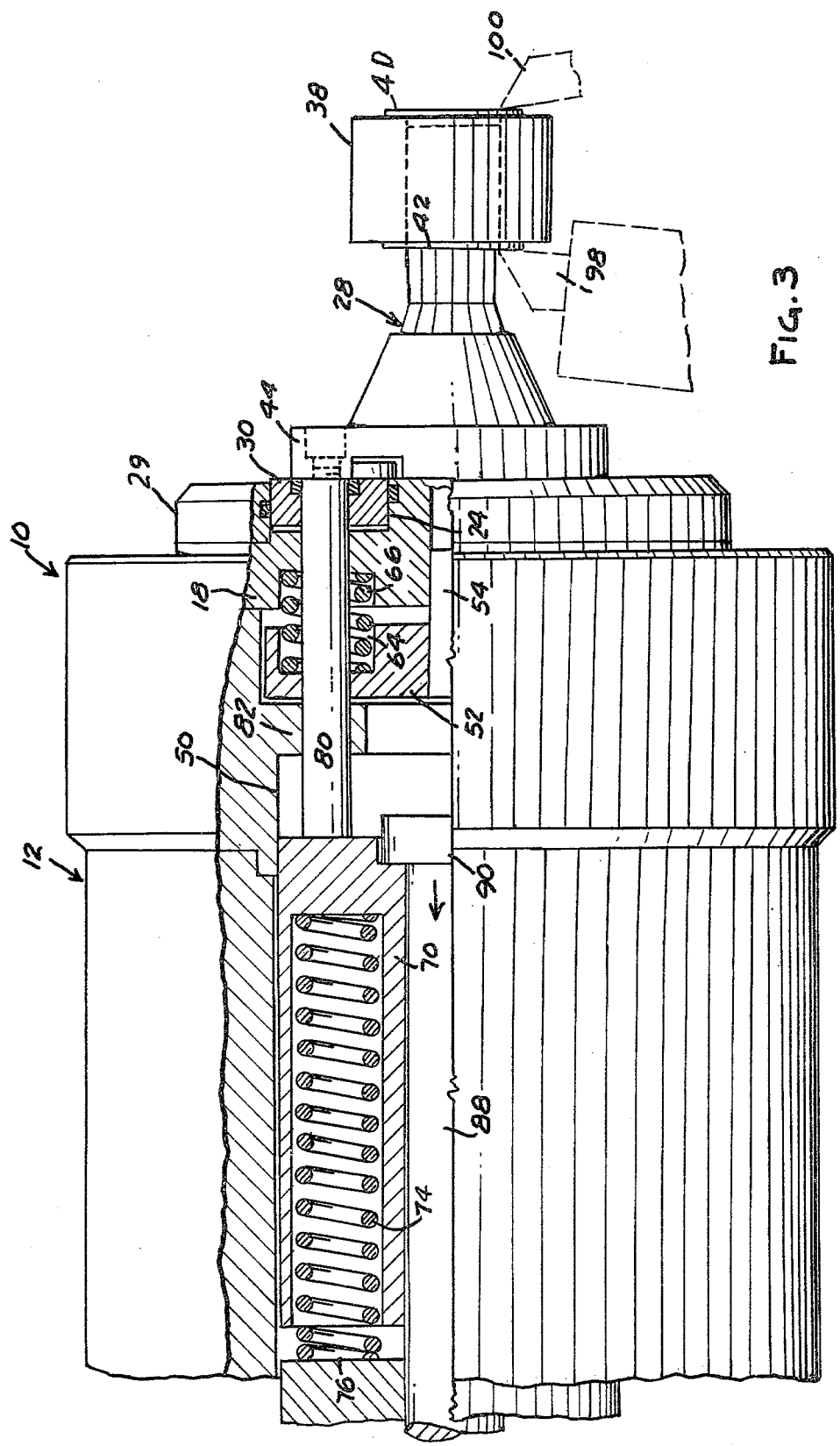

CHUCK WITH RETRACTABLE STOP

This invention relates to a chuck, and, more particularly, to a collet chuck with a retractable workpiece locating stop.

In many types of machining operations a centrally bored workpiece requires machining operations at its opposite end faces. Such workpieces are frequently supported in a chuck having a workpiece-engaging stop thereon for locating the workpiece axially on the chuck in an accurately predetermined position. Since the work-engaging stop normally engages the back or rear face of the chuck-supported workpiece, after the front face of the workpiece is machined the workpiece is removed from the chuck, turned end for end, and then mounted on the same or another chuck for machining the end face that was initially engaged by the workpiece stop. Removal of the workpiece from the chuck to enable machining both end faces is required because the locating stop on the chuck frequently engages the end face which has to be machined and would, thus, interfere with the cutting tool for machining the stop-engaging face of the workpiece.

The object of this invention is to eliminate the necessity of removing a workpiece from a chuck in order to machine its opposite end faces.

More specifically, it is an object of this invention to provide a chuck having a workpiece-locating stop thereon adapted to engage an end face of the workpiece to be machined and retractable after the workpiece is located and gripped by the chuck so that the stop will not interfere with the cutting tool for machining the end face engaged by the workpiece.

Another object of this invention is to provide a chuck having a work-gripping member and a retractable stop thereon interconnected by a drawbar such that, when the drawbar is displaced forwardly, the workpiece stop is projected to the workpiece-locating position, and, when the drawbar is thereafter retracted, the work-gripping member grips the workpiece and the stop is thereafter retracted.

Other objects, features and advantages of the present invention will become apparent from the following description and accompanying drawings, in which:

FIG. 3 is a view similar to FIG. 1 showing the workpiece engaged by the chuck and the workpiece-locating stop in a retracted position.

Figure 1:
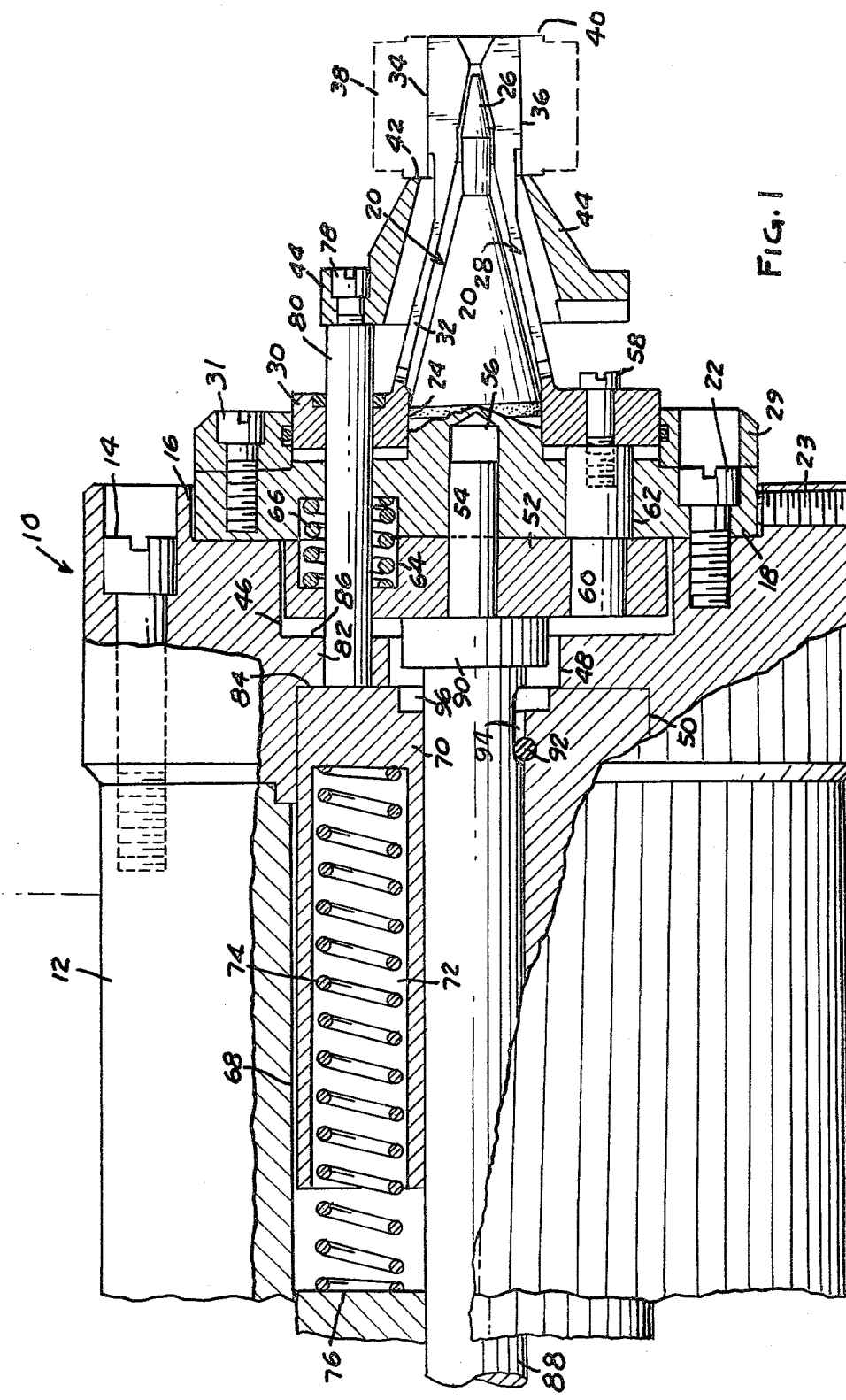
FIG. 1 is a side elevational view, partly in section, of a chuck according to the present invention showing the parts thereof in the positions assumed for initially mounting a workpiece on the chuck.

The chuck of the present invention comprises a body 10 adapted to be secured to a rotary driven spindle 12 of a machine tool by means of a plurality of screws 14. The front face of body 10 is formed with a circular recess 16 in which the base flange 18 of an expander member 20 is secured as by screws 22 and centered therein by screws 23. Expander member 20 has a forwardly projecting cylindrical boss 24 terminating in a conical nose 26 at the forward end thereof. The expandable collet, generally designated 28, has an annular base plate portion 30 which is guided for axial movement on the cylindrical boss 24 of expander member 20. The outer periphery of plate portion 30 has a close sliding fit with a ring 29 secured to flange 18 by screws 31. Collet 28 includes a sleeve portion comprising a plurality of circumferentially adjacent spring fingers 32 which are separated by axially extending slots. The distal end of collet 28 is internally tapered to correspond with the taper on the conical nose 26 of expander member 20. The outer periphery of collet 28 at its forward end is cylindrically shaped as at 34 for engaging the internal cylindrical bore 36 of a workpiece 38. Workpiece 38 has a front face 40 and a rear face 42, both of which require machining. The axial position of workpiece 38 on collet 28 is determined by an annular stop 44 adapted to be abutted by the face 42.

Body 10 is formed with three bores 46,48,50 concentric with recess 16 at the front face thereof. Within bore 46 there is arranged a collet actuator comprising a puller plate 52 which is guided for axial movement by means of a pilot pin 54 in a bore 56 extending along the central axis of expander member 20. The base plate portion 30 of collet 28 is connected by screws 58 with pins 60 fixed on puller plate 52. Pins 60 are slideable through openings 62 in the base flange 18 of expander 20. The rear face of base flange 18 and the front face of plate 52 are formed with a plurality of axially aligned pockets 64 in which are arranged springs 66. Springs 66 normally bias puller plate 52 rearwardly so that the forward cylindrical end 34 of collet 28 is radially expanded by the conical nose portion 26 to grip workpiece 38.

Within the bore 50 of body 10 and an axially aligned bore 68 in spindle 12 there is slideably arranged pusher member for the workpiece stop 44 in the form of a bushing 70. Bushing 70 is formed with a plurality of circumferentially spaced, axially extending pockets 72 in which are arranged compression springs 74. The forward ends of springs 74 bear against the front ends of pockets 72 and the rear ends of springs 74 bear against a fixed shoulder 76 on spindle 12. Stop 44 is connected by screws 78 to a plurality of pins 80 which extend through base plate 30 of collet 28, base flange 18 of expander 20, puller plate 52, and the annular disc portion 82 of body 10 which separates bores 46,50. The inner ends of pins 80 are securely connected to the front end of bushing 70. Springs 74 normally bias bushing 70 forwardly into abutting relation with the rear face 84 of the disc portion 82 which separates bores 46,50. The rear face 84 of disc portion 82 forms a stop shoulder for bushing 70 which locates the forward end of stop 44 in an accurately predetermined, axial position against which the rear face 42 of workpiece 38 is adapted to abut. If desired, a disc spacer can be located against face 84 to obtain the desired location of the front end of stop 44. It will be noted that, when the forward end of bushing 70 abuts the face 84, the rear end of bushing 70 is spaced axially forwardly from the fixed shoulder 76 on the spindle 12. Likewise, it will be noted that the axial dimension of bore 46 between the front face 86 of disc portion 82 and the rear face of base flange 18 is substantially greater than the axial thickness of puller plate 52.

Within spindle 12 there is arranged an axially shiftable drawbar 88 which is slideably arranged within bushing 70 along the central axis of the chuck. At its forward end drawbar 88 is formed with an enlarged cylindrical head 90. Drawbar 88 is prevented from rotating relative to bushing 70 by means of a pin 92 on bushing 70 engaging a flat 94 formed with a counterbore 96 which is at least slightly larger than the diameter of the enlarged head 90 at the forward end of the drawbar 88.

In order to mount a workpiece 38 on the cylindrical end 28 of collet 28 the collet has to be shifted forwardly to collapse the cylindrical end 34 to a diameter at least slightly less than the bore 36 of the workpiece. The cylindrical end 34 is collapsed by shifting the collet forwardly. This is accomplished by displacing drawbar 88 forwardly so that the enlarged head 90 thereof passes through bore 48, abuts against puller plate 52, and displaces it forwardly to the position shown in FIG. 1 wherein springs 66 are compressed. When drawbar 88 is shifted forwardly, the enlarged head 90 moves out of engagement with the end face of counterbore 96 of bushing 70 so that the bushing 70 is free to shift forwardly under the bias of springs 74 to the position shown in FIG. 1 wherein the front end of bushing 70 engages the shoulder face 84 of disc portion 82 in body 10. Thus, when the drawbar 88 is shifted forwardly to the position shown in FIG. 1, the collet is collapsed and a workpiece 38 is adapted to be slipped over the cylindrical end portion 34 into engagement with the annular stop 44 which has been pushed forwardly by bushing 70.

Figure 2:
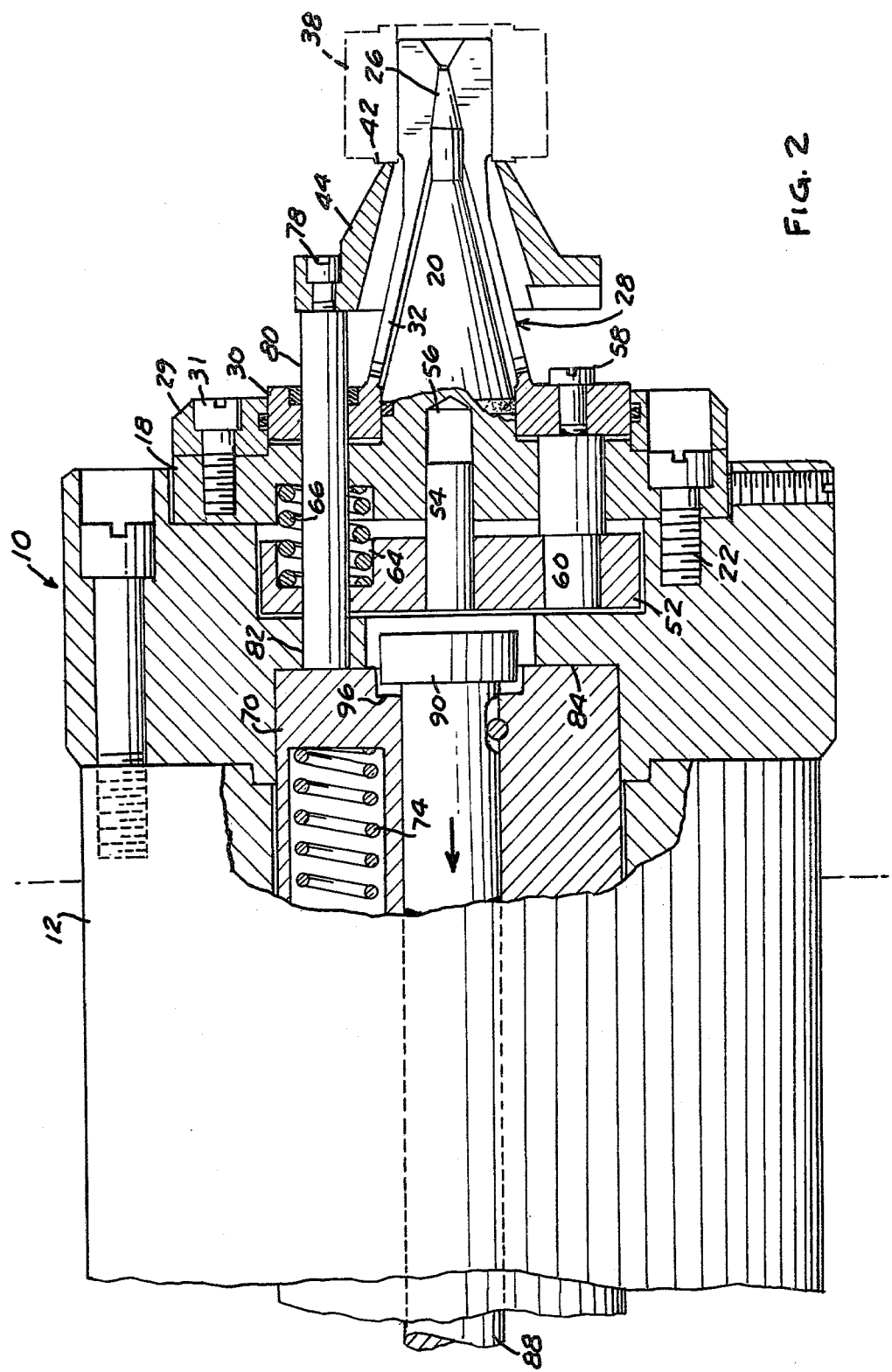
FIG. 2 is a view similar to FIG. 1 and showing the workpiece firmly engaged by the chuck.

Referring now to FIG. 2, after the workpiece is placed over the collet, drawbar 88 is retracted. As soon as drawbar 88 starts to retract, puller plate 52 is shifted rearwardly by springs 66 to interengage the end 34 of the collet with the conical nose 26 of expander 20 and, thus, expand end 34 into firm engagement with the bore 36 of workpiece 38. The axial dimension of bore 46 is such that the collet will be fully expanded by springs 66 before the rear face of puller plate 52 engages the front face 86 of the disc portion 82 in body 10.

Thus, as the drawbar continues to retract, the enlarged head 90 at the forward end thereof moves out of engagement with puller plate 52 and, thereafter, engages bushing 70 and displaces the bushing rearwardly against the bias of springs 74. Since the annular stop 44 is connected to bushing 70 by pins 80, the stop 44 is retracted to the position shown in FIG. 3 after the workpiece is firmly gripped by the collect. Thus, with the parts of the collet in the position illustrated in FIG. 3, the workpiece 38 is located in an accurately predetermined axial portion on and firmly gripped by the collet. However, since the stop 44 is in the retracted position, cutting tools 98,100 are adapted to be advanced toward the workpiece for machining faces 40,42 without any interference from the stop 44.

I claim:

1. A chuck having a body at its rear end adapted to be mounted on a machine tool and having a work-gripping member at its forward end which is actuatable to a work-engaging position and a work-releasing and receiving position, an actuator for the work-gripping member mounted on said body for movement in a rearward direction to cause the work-gripping member to engage a workpiece and in a forward direction to release a workpiece and be conditioned to accept another workpiece, means biasing said actuator in said rearward direction to cause the work-gripping member to assume said work-engaging position, a work-engaging stop mounted on said body for movement in opposite directions between retracted and work-locating positions, means biasing said stop to said work-locating position, a drawbar mounted on said body for axial movement forwardly and rearwardly of the body, means interconnecting said drawbar and actuator for shifting the work-gripping member to the work-releasing position against the biasing force thereon when the drawbar is moved forwardly so that it can accept another workpiece, and means interconnecting the drawbar and stop for retracting the stop against the biasing force thereon when the drawbar is shifted rearwardly, whereby when the drawbar is shifted forwardly, the work-gripping member is actuated to the work-releasing position and is conditioned to receive another workpiece and the stop is biased to said work-locating position and when the drawbar is shifted rearwardly the actuator is biased in a rearward direction to cause the work-gripping member to assume the work-engaging position and the stop is moved to its retracted position.

2. A chuck as called for in claim 1 wherein said stop is mounted for reciprocation axially of said body.

3. A chuck as called for in claim 2 wherein the stop is shiftable in a forward direction on said body to said work-locating position.

4. A chuck as called for in claim 3 including shoulder means on said body for limiting the forward movement of said stop to an accurately predetermined position.

5. A chuck as called for in claim 3 wherein said actuator comprises an axially shiftable puller member connected to said work-gripping member and including an axially shiftable pusher member in said body connected with said stop, said pusher and puller members being spaced axially apart in said body.

6. A chuck as called for in claim 5 wherein both of said interconnecting means comprises a abutment means on said drawbar disposed axially between said puller and pusher members and adapted to displace the puller member forwardly when the drawbar is shifted forwardly and the pusher member rearwardly when the drawbar is retracted.

7. A chuck as called for in claim 6 wherein said drawbar extends through said pusher member and said abutment means comprises an abutment located adjacent the forward end of the drawbar.

8. A chuck as called for in claim 6 including shoulder means on said body for limiting movement of said pusher member in a forward direction.

9. A chuck as called for in claim 8 wherein said abutment means on the drawbar is adapted to be disposed between and out of abutting engagement with both said pusher and puller members when the puller member is displaced to its fully retracted position under the influence of the biasing means acting thereon and said pusher member is displaced to its fully advanced position under the influence of the biasing means acting thereon, whereby, when the drawbar is retracted from its forward position, initial movement thereof causes the work-gripping member to assume its work-gripping position before the stop member is retracted.

10. A chuck as called for in claim 7 wherein said biasing means comprises compression springs.

11. A chuck as called for in claim 1 wherein the work-gripping member comprises a collet sleeve and including means on said body for expanding said sleeve to said work-engaging position.

12. A chuck as called for in claim 11 wherein said sleeve expanding means is fixedly mounted on said body and said sleeve is connected with said actuator for movement therewith.

13. A chuck as called for in claim 1 wherein said interconnecting means comprises a lost motion connection between the drawbar, actuator and stop which, when the drawbar is shifted rearwardly, first causes the work-gripping member to be actuated to the work-gripping position and subsequently moves the stop from the work-locating to the retracted position.

* * * * *